US012596182B2

(12) United States Patent
Chen et al.

(10) Patent No.: US 12,596,182 B2
(45) Date of Patent: Apr. 7, 2026

(54) OPTICAL SYSTEM FOR LIGHT DETECTION AND RANGING

(71) Applicant: Lumentum Operations LLC, San Jose, CA (US)

(72) Inventors: James Chen, New Taipei City (TW); Michael Miller, Ottawa (CA); Eric R. Hegblom, Sunnyvale, CA (US); Lijun Zhu, Dublin, CA (US); Paul Colbourne, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 853 days.

(21) Appl. No.: 17/938,848

(22) Filed: Oct. 7, 2022

(65) Prior Publication Data

US 2024/0019551 A1 Jan. 18, 2024

Related U.S. Application Data

(60) Provisional application No. 63/368,435, filed on Jul. 14, 2022.

(51) Int. Cl.
*G01S 17/89* (2020.01)
*G01S 7/481* (2006.01)

(52) U.S. Cl.
CPC .......... *G01S 7/4817* (2013.01); *G01S 7/4815* (2013.01); *G01S 7/4816* (2013.01); *G01S 17/89* (2013.01)

(58) Field of Classification Search
CPC ............................... G01S 7/4817; G01S 17/89
USPC ........................................................ 356/4.01
See application file for complete search history.

(56) References Cited

FOREIGN PATENT DOCUMENTS

WO WO-2022200269 A1 * 9/2022 ........... G01S 7/4815

* cited by examiner

*Primary Examiner* — Jeffery A Williams
(74) *Attorney, Agent, or Firm* — Harrity & Harrity, LLP

(57) ABSTRACT

In some implementations, a light detection and ranging (LIDAR) system includes a vertical cavity surface emitting laser (VCSEL) array including a plurality of VCSELs. The VCSEL array may have a first aspect ratio. The LIDAR system may include a set of transmission optics configured to receive light from the VCSEL array and to illuminate a field of view having a second aspect ratio that is greater than the first aspect ratio. The LIDAR system may include an image sensor array configured for line readout. The image sensor array may have a third aspect ratio that is different from the first aspect ratio. The LIDAR system may include a set of reception optics configured to image light reflected from objects in the field of view, having the second aspect ratio, onto the image sensor array having the third aspect ratio.

20 Claims, 4 Drawing Sheets

OPTICAL SYSTEM FOR LIGHT DETECTION AND RANGING

CROSS-REFERENCE TO RELATED APPLICATION

This Patent Application claims priority to U.S. Provisional Patent Application No. 63/368,435, filed on Jul. 14, 2022, and entitled "LINE SCAN LIGHT DETECTION AND RANGING TRANSMISSION AND RECEPTION OPTICS WITH DISTORTION CORRECTION." The disclosure of the prior Application is considered part of and is incorporated by reference into this Patent Application.

TECHNICAL FIELD

The present disclosure relates generally to light detection and ranging (LIDAR) systems and to an optical system for LIDAR.

BACKGROUND

A LIDAR system may produce an optical beam (e.g., a laser beam or the like), scan the optical beam across a field of view including one or more objects, receive a beam reflected from objects in the field of view, process the received beam, and determine three-dimensional aspects of the one or more objects. For example, the LIDAR system, based on light reflected from objects in the field of view, may construct a point cloud to determine the three-dimensional aspects of the one or more objects. A LIDAR system may scan an optical beam across a field of view, receive light reflected from the objects within the field of view, and provide the light reflected from the objects within the field of view to a receiver for processing.

SUMMARY

In some implementations, a LIDAR system includes a vertical cavity surface emitting laser (VCSEL) array including a plurality of VCSELs. The plurality of VCSELs may be arranged in a plurality of channels, and the VCSEL array may be configured to illuminate on a per-channel basis. The VCSEL array may have a first aspect ratio. The LIDAR system may include a set of transmission optics configured to receive light from the VCSEL array and to illuminate a field of view having a second aspect ratio that is greater than the first aspect ratio. The LIDAR system may include an image sensor array configured for line readout. The image sensor array may have a third aspect ratio that is different from the first aspect ratio. The LIDAR system may include a set of reception optics configured to image light reflected from objects in the field of view, having the second aspect ratio, onto the image sensor array having the third aspect ratio.

In some implementations, an optical transmitter includes an emitter array including a plurality of optical emitters. The emitter array may be configured for solid-state line scanning. The emitter array may have a first aspect ratio. The optical transmitter may include a set of transmission optics configured to receive light from the emitter array and to illuminate a field of view having a second aspect ratio that is greater than the first aspect ratio. A horizontal dimension of the field of view may be at least two times greater than a vertical dimension of the field of view.

In some implementations, an optical receiver includes an image sensor array configured for line readout. The image sensor array may be configured to receive light, from an emitter array having a first aspect ratio, that is reflected from objects in a field of view having a second aspect ratio that is greater than the first aspect ratio. The image sensor array may have a third aspect ratio that is different from the first aspect ratio and the second aspect ratio. The optical receiver may include a set of reception optics configured to image light reflected from the objects in the field of view, having the second aspect ratio, onto the image sensor array having the third aspect ratio.

DETAILED DESCRIPTION

Figure 1:
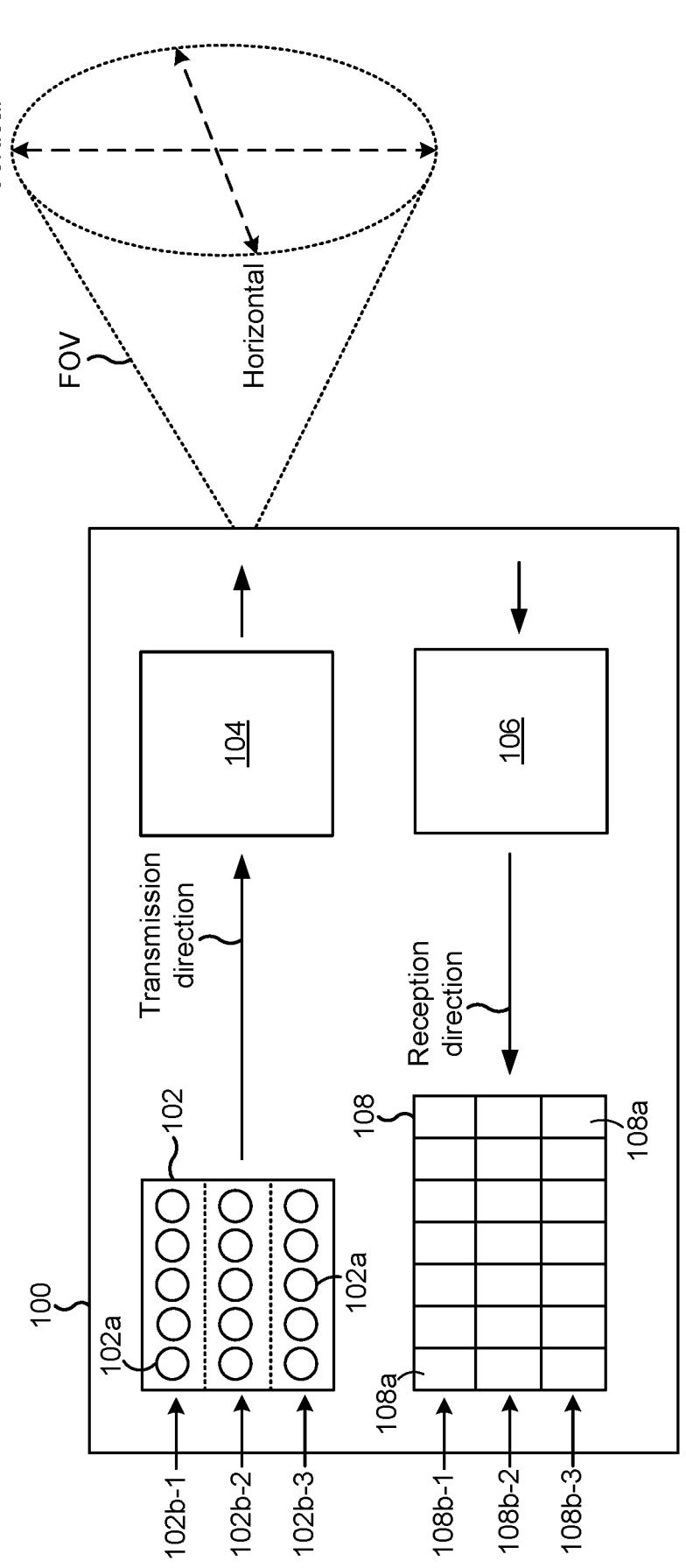
FIG. 1 is a diagram illustrating an example LIDAR system.

The following detailed description of example implementations refers to the accompanying drawings. The same reference numbers in different drawings may identify the same or similar elements.

A LIDAR system may employ a multi-channel emitter array (e.g., a multi-channel VCSEL array) as a light source for scanning a field of view (FOV). In the multi-channel emitter array, rows of emitters of the emitter array may correspond to channels of the emitter array. The multi-channel emitter array may be powered-on one channel (or multiple channels) at a time, and the channels may be scanned from the top to the bottom of the emitter array. Light returning from within the FOV of the LIDAR system may be measured using a two-dimensional (2D) image sensor array of pixels that is scanned line-by-line (which may be referred to as "line readout"). Line readout of the image sensor array may be synchronized with the light transmission of the emitter array.

In some contexts, such as for automotive use, the LIDAR system having a relatively wide horizontal FOV may be desirable. For example, the FOV of the LIDAR system may be 122° in the horizontal by 32° in the vertical. Generally, aspect ratios of the emitter array and/or the image sensor may be similar to the angular aspect ratio of the FOV of the LIDAR system. However, for the LIDAR system with the relatively wide horizontal FOV, this may result in the emitter array and/or the image sensor being excessively large and/or complex as well as having significant power demands. Moreover, when the aspect ratios of the emitter array and/or the image sensor are unmatched with the FOV, the use of conventional transmission and/or reception optics in the LIDAR system may produce suboptimal results. For example, with conventional transmission optics and reception optics, light that is projected from the LIDAR system (e.g., line-by-line of the emitter array) onto a target, and light that is reflected back to the LIDAR system from the target, may be distorted and have line aberrations.

Some implementations described herein provide transmission optics and reception optics for a LIDAR system with a relatively wide FOV in the horizontal. In particular, the LIDAR system may be solid state (e.g., mechanical rotating mirrors or other moving parts are not used to scan the FOV) and use line scanning (e.g., channels of an emitter array of the LIDAR system are powered-on sequentially, as described above). In some implementations, an aspect ratio of the emitter array may be different from an aspect ratio of an image sensor of the LIDAR system. Moreover, the aspect ratio of the emitter array and/or the aspect ratio of the image sensor may be different from an aspect ratio of the FOV of the LIDAR system.

In some implementations, the transmission optics may include a collimating lens, with double freeform surfaces, that receives light from the emitter array, and a one-dimensional diffuser that receives light from the collimating lens. Light from the diffuser defines the wide horizontal FOV of the LIDAR system, and the collimating lens provides aberration correction over the vertical FOV. In some implementations, the reception optics may include a first set of spherical lenses with negative focal lengths and a second set of spherical lenses with positive focal lengths. The spherical lenses in this configuration provide distortion and aberration correction.

The transmission optics and reception optics enable the aspect ratios of the emitter array and the image sensor to be different from each other and/or different from the aspect ratio of the FOV of the LIDAR system. This enables an overall size of the emitter array and/or the image sensor to be reduced, thereby reducing a form factor, complexity, and/or power consumption of the LIDAR system. In addition, the transmission optics enable the LIDAR system to generate undistorted and non-aberrated vertically spaced lines to fully illuminate the FOV, and the reception optics enable imaging of returning light without distortions or line aberrations (e.g., in tests performed by light being projected onto, and reflected from, a cylindrical screen). In this way, a sensing distance of the LIDAR system is improved, and a pixel efficiency of the image sensor is maximized.

FIG. 1 is a diagram illustrating an example LIDAR system 100. As shown in FIG. 1, the LIDAR system 100 may include a first optical system that includes an emitter array 102 and a set of transmission optics 104. The emitter array 102 is shown in a front view for illustration purposes, and in practice, the emitter array 102 may be arranged in a manner to direct emitted light toward the transmission optics 104. The first optical system (e.g., an optical transmitter) may be configured for light transmission of the LIDAR system 100 (e.g., for emitting light from the LIDAR system 100). In addition, the LIDAR system 100 may include a second optical system that includes a set of reception optics 106 and an image sensor array 108. The image sensor array 108 is shown in a front view for illustration purposes, and in practice, the image sensor array 108 may be arranged in a manner to receive light from the reception optics 106 on an active area of the image sensor array 108. The second optical system (e.g., an optical receiver) may be configured for light reception of the LIDAR system 100 (e.g., for receiving light reflected to the LIDAR system 100). The LIDAR system 100, using the first optical system, may direct light toward one or more objects in an FOV of the LIDAR system 100 (e.g., at a distance of more than 5 meters from the LIDAR system 100, such as 20 meters from the LIDAR system 100). The LIDAR system 100, using the second optical system, may image light returning from objects within the FOV of the LIDAR system 100. In some implementations, the LIDAR system (e.g., the emitter array 102, the set of transmission optics 104, the set of reception optics 106, and the image sensor array 108) may be contained within a space (e.g., a module) having dimensions of 110 millimeters (mm) (e.g., in length, which may be orthogonal to an optical transmission or reception direction) by 50 mm (e.g., in width, which may be along an optical transmission or reception direction) by 55 mm (e.g., in height).

The set of transmission optics 104 may be configured to receive light from the emitter array 102. For example, the set of transmission optics 104 may be positioned in front of the emitter array 102 in the transmission direction of the LIDAR system 100. That is, the set of transmission optics 104 may be positioned such that light emitted from the emitter array 102 passes through the set of transmission optics 104. The set of reception optics 106 may be configured to provide light to (e.g., image light onto) the image sensor array 108 (e.g., the image sensor array 108 may be configured to receive light from the set of reception optics 106). For example, the set of reception optics 106 may be positioned in front of the image sensor array 108 in the reception direction of the LIDAR system 100. That is, the set of reception optics 106 may be positioned such that light leaving the set of reception optics 106 is directed onto the image sensor array 108.

The emitter array 102 may include a plurality of optical emitters 102a. For example, the emitter array 102 may be a VCSEL array that includes a plurality of VCSELs. In some implementations, the emitter array 102 may include a plurality of another type of vertically-emitting emitters, a plurality of edge-emitting emitters, or the like. The emitter array 102 may be configured for solid-state line scanning.

In particular, the plurality of optical emitters 102a may be arranged in a plurality of channels 102b (e.g., 56 channels), shown as channels 102b-1, 102b-2, and 102b-3 (however, any quantity of channels 102b may be used), of the emitter array 102. For example, a channel 102b of the emitter array 102 may correspond to a row of the emitter array 102, as shown. In some implementations, a channel 102b of the emitter array 102 may correspond to a column of the emitter array 102. Whether channels 102b of the emitter array 102 correspond to rows or columns of the emitter array 102 may be based on whether lines of the image sensor array 108 are read out by rows or by columns. The emitter array 102 may be configured to illuminate optical emitters 102a on a per-channel basis. That is, the emitter array 102 may be addressable in one dimension. For example, the emitter array 102 may be configured to illuminate optical emitters 102a of a first channel 102b-1 (e.g., when an electrical current is supplied to the first channel 102b-1), illuminate optical emitters 102a of a second channel 102b-2 (e.g., when an electrical current is supplied to the second channel 102b-2), and so forth, sequentially. The emitter array 102 may be configured to illuminate optical emitters 102a on a per-channel basis in order from the first channel 102b-1 to a last channel 102b-3 of the emitter array 102, from the last channel 102b-3 to the first channel 102b-1 of the emitter array 102, at random, or the like.

The image sensor array 108 may include a plurality of pixels 108a (i.e., photodetection pixels) arranged in one or more rows and in one or more columns. For example, the image sensor array 108 may include a single-photon avalanche diode (SPAD) array or another type of photodetector array (e.g., employing another type of photodiode). The image sensor array 108 may be configured for readout by lines 108b (e.g., configured for line readout), shown as lines 108b-1, 108b-2, and 108b-3 (however, any quantity of lines 108b may be used). That is, the plurality of pixels 108a may be read out from the image sensor array 108 line by line (e.g., row by row). A line 108b that is read out from the image sensor array 108 may correspond to a row or a column of the image sensor array 108.

The discussion of aspect ratios herein may relate to horizontal:vertical aspect ratios (e.g., in linear dimensions of a width to a height, in angular dimensions of horizontal degrees to vertical degrees, or the like). In some implementations, an aspect ratio of the emitter array 102 (e.g., of an active area of the emitter array 102) and/or an aspect ratio of the image sensor array 108 (e.g., of an active area of the image sensor array 108) may not match an aspect ratio of the FOV of the LIDAR system 100. In some implementations, the aspect ratio of the image sensor array 108 may be similar to the FOV of the LIDAR system 100. For example, the aspect ratio of the image sensor array 108 (e.g., expressed as a single number) may be within 10% of the aspect ratio of the FOV (whereas the aspect ratio of the emitter array 102 may differ by at least 95% from the aspect ratio of the FOV). In some implementations, an aspect ratio of the image sensor array 108 may be different from an aspect ratio of the emitter array 102. For example, the aspect ratio of the emitter array 102 may be smaller than the aspect ratio of the image sensor array 108. Moreover, a dimensional size (e.g., a length and/or a width) of the image sensor array 108 may be different from a dimensional size of the emitter array 102. For example, the dimensional size of the emitter array 102 may be smaller than the dimensional size of the image sensor array 108. As an example, a width of the emitter array 102 may be less than a width of the image sensor array 108.

In some implementations, the emitter array 102 (e.g., an active area of the emitter array 102) may have dimensions of about 1.1 mm in the horizontal and about 7.7 mm in the vertical. Thus, the aspect ratio of the emitter array 102 may be in a range from 0.12 to 0.16, such as about 0.14. In some implementations, the image sensor array 108 (e.g., an active area of the image sensor array 108) may have dimensions of about 5.8 mm in the horizontal and about 1.7 mm in the vertical. Thus, the aspect ratio of the image sensor array 108 may be in a range from 3 to 3.8, such as about 3.43.

A horizontal dimension of the FOV (e.g., the horizontal FOV, in degrees) of the LIDAR system 100 may be at least two times greater, or at least three times greater, than a vertical dimension of the FOV (e.g., the vertical FOV, in degrees) of the LIDAR system 100. In some implementations, the FOV of the LIDAR system may be about 126° in the horizontal by about 30° in the vertical, about 122° in the horizontal by about 32° in the vertical, about 20° in the horizontal by about 5° in the vertical, about 30° in the horizontal by about 9° in the vertical, or about 120° in the horizontal by about 45° in the vertical. In some implementations, the aspect ratio of the FOV may be in a range from about 2.6 to about 4.2, such as about 3.81.

As indicated above, FIG. 1 is provided as an example. Other examples may differ from what is described with regard to FIG. 1.

Figure 2:
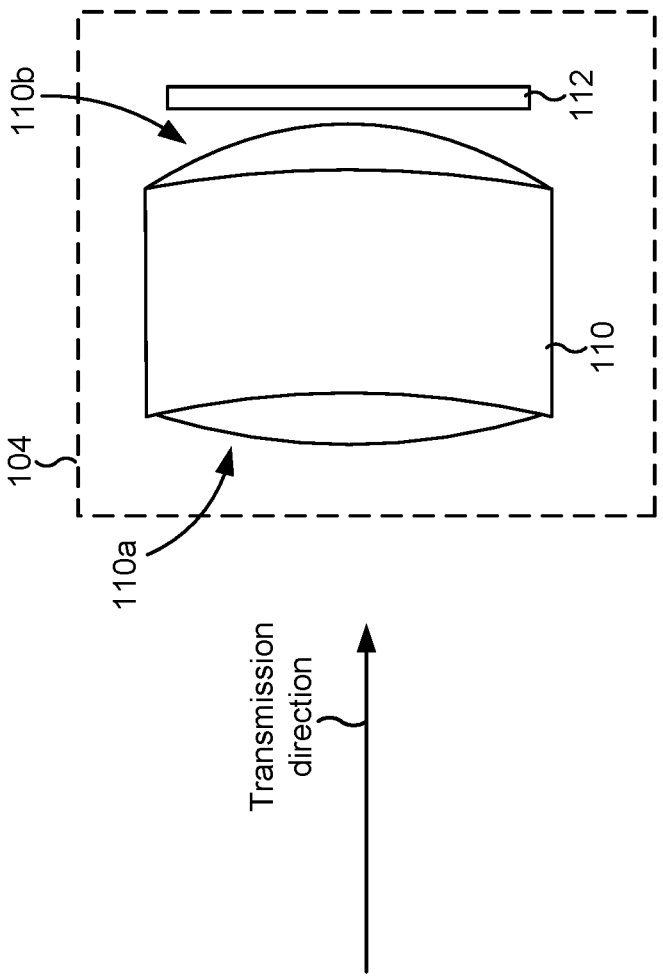
FIG. 2 is a diagram illustrating an example of a set of transmission optics.

FIG. 2 is a diagram illustrating an example of the set of transmission optics 104. The set of transmission optics 104 may be configured to receive light from the emitter array 102, which may have an aspect ratio as described above, and to illuminate the FOV of the LIDAR system, which may have an aspect ratio that is greater than the aspect ratio (e.g., at least 15 times greater) of the emitter array 102 as described above.

As shown, the set of transmission optics 104 may include a collimating lens 110 and a diffuser 112. The collimating lens 110 may be configured to receive light from the emitter array 102, and the diffuser may be configured to receive light from the collimating lens 110. A focal length of the collimating lens 110 may define a vertical FOV of the LIDAR system 100, and the diffuser 112 may produce the horizontal FOV of the LIDAR system 100. In some implementations, the set of transmission optics 104 may include a distortion correction element (not shown) to correct slight edge distortion of the horizontal FOV.

The collimating lens 110 may have a first freeform surface 110a and a second freeform surface 110b opposite the first freeform surface 110a. A surface profile of the first freeform surface 110a may be different from a surface profile of the second freeform surface 110b. A focal length in the horizontal of the freeform surfaces 110a, 110b may be different from a focal length in the vertical of the freeform surfaces 110a, 110b. The freeform surfaces 110a, 110b may be configured to reduce line aberrations associated with the channels 102b of the emitter array 102.

The diffuser 112 may include a light diffuser (e.g., a refractive diffuser or a diffractive diffuser). The diffuser 112 may provide one-dimensional light diffusion (e.g., the diffuser 112 may be one-dimensional diffraction gratings with a periodic unit cell that determines the intensity profile or irradiance profile of projected light). For example, the diffuser 112 may be configured to diffuse light along a length of the plurality of channels 102b of the emitter array 102. As an example, the diffuser 112 may be configured to diffuse light in the horizontal (i.e., if the channels 102b of the emitter array 102 extend horizontally). In particular, the diffuser 112 may be configured to diffuse light over the horizontal FOV of the LIDAR system 100. In this way, while the aspect ratio of the emitter array 102 does not match with the aspect ratio of the FOV of the LIDAR system 100, the diffuser 112 may be configured to diffuse light (e.g., in the horizontal) from the emitter array 102 over the FOV of the LIDAR system 100 (e.g., the diffused light from the diffuser 112 defines the horizontal FOV of the LIDAR system 100 rather than being defined by the aspect ratio of the emitter array 102).

As indicated above, FIG. 2 is provided as an example. Other examples may differ from what is described with regard to FIG. 2.

Figure 3A:
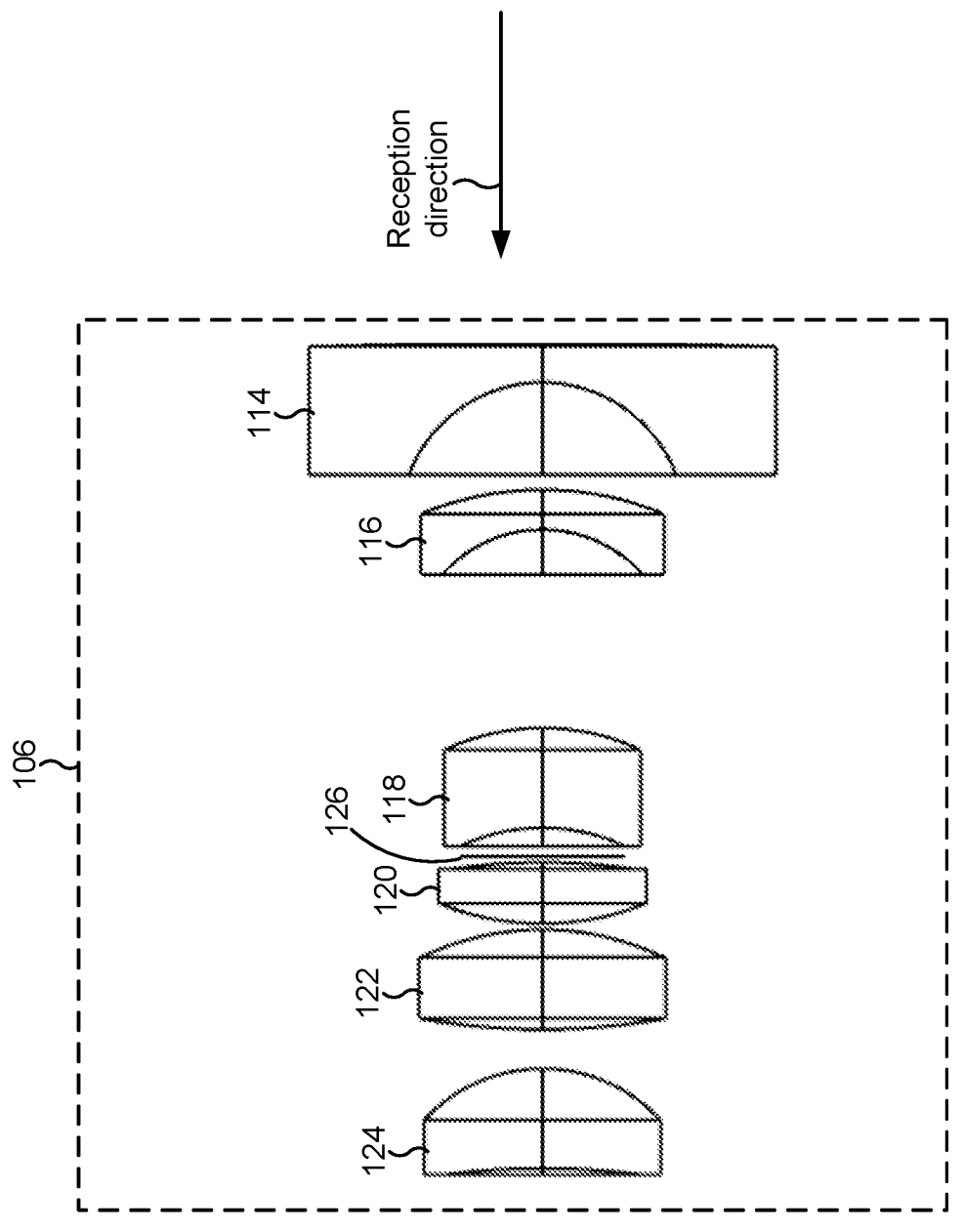
FIG. 3A is a diagram illustrating an example of a set of reception optics.

FIG. 3A is a diagram illustrating an example of the set of reception optics 106. The set of reception optics 106 may be configured to image light reflected from objects within the FOV, which has an aspect ratio as described above, onto the image sensor array 108 (e.g., an active area of the image sensor array 108), which has an aspect ratio as described above.

As shown, the set of reception optics 106 may include multiple spherical lenses. For example, the set of reception optics 106 may include a first set of spherical lenses with negative focal lengths and a second set of spherical lenses with positive focal lengths. In particular, the set of reception optics 106 may include a first spherical lens 114 to receive light reflected from one or more objects in the FOV of the LIDAR system 100, a second spherical lens 116 to receive light from the first spherical lens 114, a third spherical lens 118 to receive light from the second spherical lens 116, a fourth spherical lens 120 to receive light from the third spherical lens 118, a fifth spherical lens 122 to receive light from the fourth spherical lens 120, and a sixth spherical lens 124 to receive light from the fifth spherical lens 122. The set of reception optics 106 may also include an optical aperture 126 (e.g., an aperture stop) between the third spherical lens 118 and the fourth spherical lens 120 (e.g., between the first set of spherical lenses with negative focal lengths and the second set of spherical lenses with positive focal lengths). In some implementations, the set of reception optics 106 may be associated with an f-number of 1.2. The set of reception optics 106 may be rotationally symmetric, and therefore may have the same magnifications in a horizontal direction and in a vertical direction.

In some implementations, a distance between the second spherical lens 116 and the third spherical lens 118 (e.g., at least 6 mm or at least 7 mm) may be greater than a distance between any two other adjacent spherical lenses of the set of reception optics 106. In some implementations, a distance between the fifth spherical lens 122 and the sixth spherical lens 124 (e.g., at least 2 mm) may be greater than a distance between the first spherical lens 114 and the second spherical lens 116, a distance between the third spherical lens 118 and the fourth spherical lens 120, and a distance between the fourth spherical lens 120 and the fifth spherical lens 122.

The first spherical lens 114, the second spherical lens 116, and the third spherical lens 118 may each have negative focal lengths (e.g., of −14.42 mm, −24.831 mm, and −577.33 mm, respectively), and a combination of the first spherical lens 114, the second spherical lens 116, and the third spherical lens 118 (which may be referred to herein as a "negative focal length group") may have a negative focal length (e.g., of −6.125 mm). That is, the first spherical lens 114, the second spherical lens 116, and the third spherical lens 118 may each be configured to diverge light. Respective focal lengths of the first spherical lens 114, the second spherical lens 116, and the third spherical lens 118 may be different from each other. In some implementations, the third spherical lens 118 may have a greater negative focal length (e.g., at least 20 times greater or at least 24 times greater) than a negative focal length of the second spherical lens 116, and the second spherical lens 116 may have a greater negative focal length (e.g., at least 1.5 times greater or at least 1.7 times greater) than a negative focal length of the first spherical lens 114. In some implementations, a ratio of the focal length of the first spherical lens 114 to the focal length of the second spherical lens 116 is in a range from 0.4 to 0.8. The negative focal length group may be configured to control an angle of incidence of light at the optical aperture 126 to 20° or less.

The fourth spherical lens 120, the fifth spherical lens 122, and the sixth spherical lens 124 may each have positive focal lengths (e.g., of 19.313 mm, 20.436 mm, and 19.067 mm, respectively), and a combination of the fourth spherical lens 120, the fifth spherical lens 122, and the sixth spherical lens 124 (which may be referred to herein as a "positive focal length group") may have a positive focal length (e.g., of 7.461 mm). That is, the fourth spherical lens 120, the fifth spherical lens 122, and the sixth spherical lens 124 may each be configured to converge light. Respective focal lengths of the fourth spherical lens 120, the fifth spherical lens 122, and the sixth spherical lens 124 may be different (e.g., slightly different) from each other. In some implementations, the fifth spherical lens 122 may have a greater focal length than the fourth spherical lens 120 and the sixth spherical lens 124. In some implementations, focal lengths of the fourth spherical lens 120 and the sixth spherical lens 124 may be within 10%, or within 7%, of the focal length of the fifth spherical lens 122. In some implementations, the focal length of the sixth spherical lens 124 is within 2% of the focal length of the fourth spherical lens 120. In some implementations, an absolute value of the ratio of the focal length of the negative focal length group to the focal length of the positive focal length group is in a range from 0.6 to 1.2. The positive focal length group may be configured to control an angle of incidence of light at the image sensor array 108 to 10° or less, and to focus light on the image sensor array 108 and correct aberrations.

In this way, the set of reception optics 106 may correct distortion in horizontal lines (corresponding to channels 102b of the emitter array 102) imaged by the LIDAR system 100. For example, the set of reception optics 106 may provide control of line deviations to within ±5 micrometers.

As indicated above, FIG. 3A is provided as an example. Other examples may differ from what is described with regard to FIG. 3A.

Figure 3B:
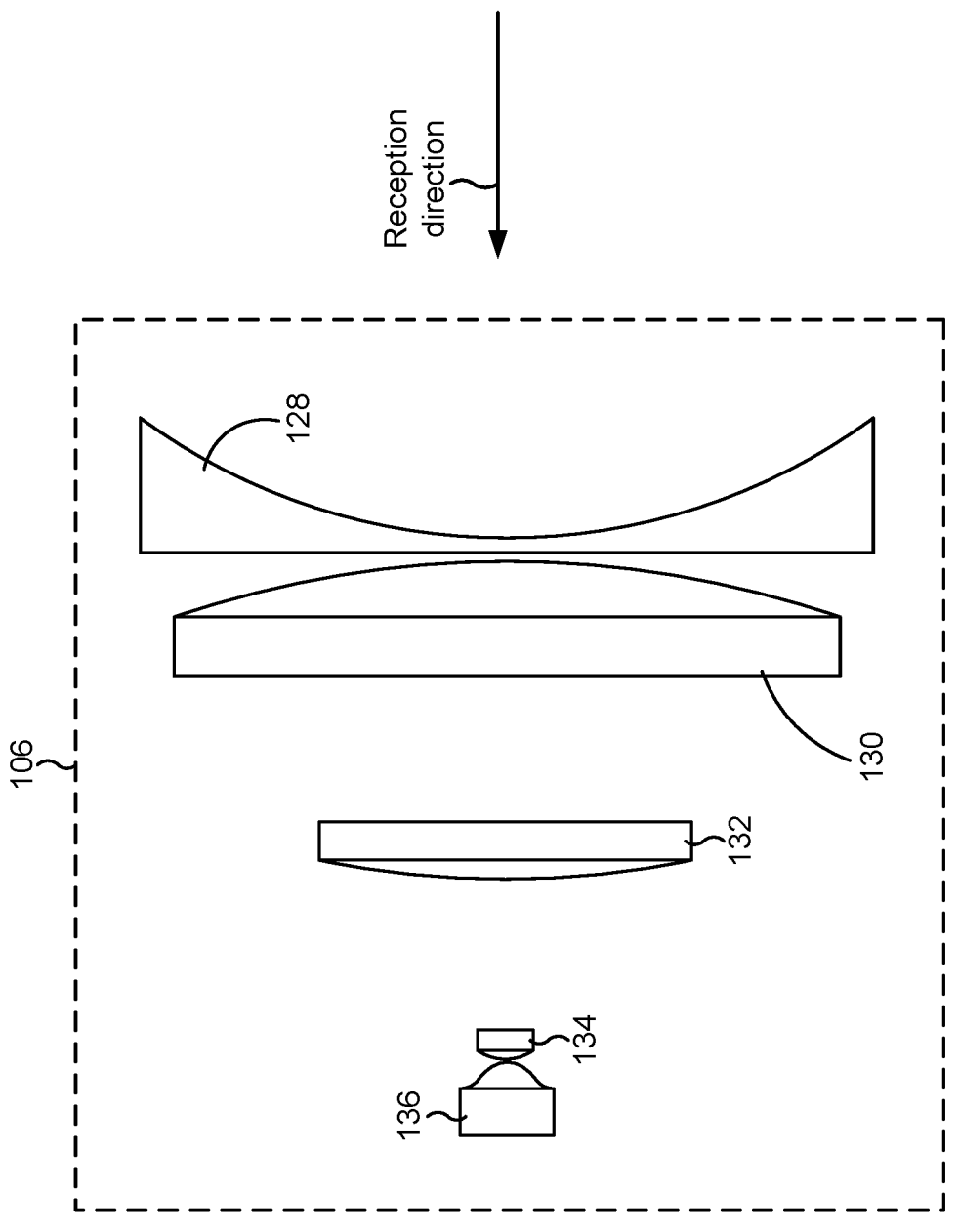
FIG. 3B is a diagram illustrating an example of a set of reception optics.

FIG. 3B is a diagram illustrating an example of the set of reception optics 106. The example set of reception optics 106 shown in FIG. 3B is an alternative to the example set of reception optics 106 shown in FIG. 3A. Nevertheless, characteristics of the example set of reception optics 106 shown in FIG. 3B may be applicable to the example set of reception optics 106 shown in FIG. 3A, and characteristics of the example set of reception optics 106 shown in FIG. 3A may be applicable to the example set of reception optics 106 shown in FIG. 3B.

As shown, the set of reception optics 106 may include a first cylindrical lens 128 to receive light reflected from one or more objects in the FOV of the LIDAR system 100, a second cylindrical lens 130 to receive light from the first cylindrical lens 128, a first spherical lens 132 to receive light from the second cylindrical lens 130, a second spherical lens 134 to receive light from the first spherical lens 132, and an aspherical lens 136 to receive light from the second spherical lens 134. The first cylindrical lens 128 and the second cylindrical lens 130 may be in a crossed arrangement (e.g., where an axis of curvature of the first cylindrical lens 128 is at a right angle to an axis of curvature of the second cylindrical lens 130). In some implementations, the first cylindrical lens 128 and the second cylindrical lens 130 may be combined into a single optical element (e.g., using injection molding or computer numerical control (CNC)).

Because the aspect ratios of the FOV of the LIDAR system 100 and the image sensor array 108 may be different (e.g., 3.81 and 3.43, respectively), the set of reception optics 106 may have different magnifications and/or focal lengths in a horizontal direction and in a vertical direction (e.g., to properly image reflected light onto an active area of the image sensor array 108). For example, the set of reception optics 106 may be configured to produce a first magnification in a horizontal direction and a second magnification, different from the first magnification, in a vertical direction. Otherwise (e.g., if lenses of the set of reception optics 106 are rotationally symmetric), distortion may occur in the vertical direction.

The first cylindrical lens 128 and the second cylindrical lens 130, in the crossed arrangement, may eliminate the distortion that may otherwise occur in the vertical direction. In some implementations, the first cylindrical lens 128 and the second cylindrical lens 130 may each have a negative focal length. Moreover, respective focal lengths of the first cylindrical lens 128 and the second cylindrical lens 130 may be different. For example, the second cylindrical lens 130 may have a greater negative focal length than a negative focal length of the first cylindrical lens 128 (e.g., at least 1.3 times greater). In some implementations, the focal length of the first cylindrical lens 128 is about −75 mm and the focal length of the second cylindrical lens 130 is about −100 mm, thereby resulting in a magnification of $1.70e^{-4}$ in the horizontal direction and a magnification of $1.47e^{-4}$ in the vertical direction. Line edge distortions or waviness of light projected by LIDAR system 100 may be corrected by the second spherical lens 134 and the aspherical lens 136.

As indicated above, FIG. 3B is provided as an example. Other examples may differ from what is described with regard to FIG. 3B.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A light detection and ranging (LIDAR) system, comprising:
a vertical cavity surface emitting laser (VCSEL) array comprising a plurality of VCSELs,
wherein the plurality of VCSELs are arranged in a plurality of channels and the VCSEL array is configured to illuminate on a per-channel basis, and
wherein the VCSEL array has a first aspect ratio;
a set of transmission optics configured to receive light from the VCSEL array and to illuminate a field of view having a second aspect ratio that is greater than the first aspect ratio;
an image sensor array configured for line readout,
wherein the image sensor array has a third aspect ratio that is different from the first aspect ratio; and a set of reception optics configured to image light reflected from objects in the field of view, having the second aspect ratio, onto the image sensor array having the third aspect ratio.

2. The LIDAR system of claim 1, wherein the set of transmission optics comprises:
a collimating lens to receive light from the VCSEL array, the collimating lens having a first freeform surface and a second freeform surface opposite the first freeform surface,
wherein a surface profile of the first freeform surface is different from a surface profile of the second freeform surface; and
a diffuser to receive light from the collimating lens,
wherein the diffuser is configured to diffuse light along a length of the plurality of channels of the VCSEL array.

3. The LIDAR system of claim 1, wherein the set of reception optics comprises:
a first spherical lens to receive light reflected from one or more objects;
a second spherical lens to receive light from the first spherical lens;
a third spherical lens to receive light from the second spherical lens,
wherein the first spherical lens, the second spherical lens, and the third spherical lens are each configured to diverge light;
a fourth spherical lens to receive light from the third spherical lens;
a fifth spherical lens to receive light from the fourth spherical lens;
a sixth spherical lens to receive light from the fifth spherical lens,
wherein the fourth spherical lens, the fifth spherical lens, and the sixth spherical lens are each configured to converge light; and
an optical aperture between the third spherical lens and the fourth spherical lens.

4. The LIDAR system of claim 1, wherein the set of reception optics comprises:
a first cylindrical lens to receive light reflected from one or more objects;
a second cylindrical lens to receive light from the first cylindrical lens,
wherein the second cylindrical lens is in a crossed arrangement to the first cylindrical lens;
a first spherical lens to receive light from the second cylindrical lens;
a second spherical lens to receive light from the first spherical lens; and
an aspherical lens to receive light from the second spherical lens.

5. The LIDAR system of claim 1, wherein the first aspect ratio of the VCSEL array is smaller than the third aspect ratio of the image sensor array.

6. The LIDAR system of claim 1, wherein the first aspect ratio of the VCSEL array is in a range from 0.12 to 0.16.

7. The LIDAR system of claim 1, wherein the second aspect ratio of the field of view is in a range from 2.6 to 4.2.

8. The LIDAR system of claim 1, wherein the third aspect ratio of the image sensor array is in a range from 3 to 3.8.

9. The LIDAR system of claim 1, wherein a horizontal dimension of the field of view is at least two times greater than a vertical dimension of the field of view.

10. An optical transmitter, comprising:
an emitter array comprising a plurality of optical emitters, wherein the emitter array is configured for solid-state line scanning; and wherein the emitter array has a first aspect ratio; and a set of transmission optics configured to receive light from the emitter array and to illuminate a field of view having a second aspect ratio that is greater than the first aspect ratio, wherein a horizontal dimension of the field of view is at least two times greater than a vertical dimension of the field of view.

11. The optical transmitter of claim 10, wherein the set of transmission optics comprises:

a collimating lens to receive light from the emitter array, the collimating lens having a first freeform surface and a second freeform surface opposite the first freeform surface; and a diffuser to receive light from the collimating lens, wherein the diffuser is configured to provide one-dimensional light diffusion.

12. The optical transmitter of claim 11, wherein a surface profile of the first freeform surface is different from a surface profile of the second freeform surface.

13. The optical transmitter of claim 10, wherein the first aspect ratio of the emitter array is in a range from 0.12 to 0.16, and wherein the second aspect ratio of the field of view is in a range from 2.6 to 4.2.

14. An optical receiver, comprising:

an image sensor array configured for line readout, wherein the image sensor array is to receive light, from an emitter array having a first aspect ratio, that is reflected from objects in a field of view having a second aspect ratio that is greater than the first aspect ratio, and wherein the image sensor array has a third aspect ratio that is different from the first aspect ratio and the second aspect ratio; and a set of reception optics configured to image light reflected from the objects in the field of view, having the second aspect ratio, onto the image sensor array having the third aspect ratio.

15. The optical receiver of claim 14, wherein set of reception optics comprises:

a first set of spherical lenses with negative focal lengths; and a second set of spherical lenses with positive focal lengths.

16. The optical receiver of claim 14, wherein the set of reception optics comprises:

a first spherical lens to receive light reflected from one or more objects;

a second spherical lens to receive light from the first spherical lens;

a third spherical lens to receive light from the second spherical lens, wherein the first spherical lens, the second spherical lens, and the third spherical lens are each configured to diverge light;

a fourth spherical lens to receive light from the third spherical lens;

a fifth spherical lens to receive light from the fourth spherical lens;

a sixth spherical lens to receive light from the fifth spherical lens, wherein the fourth spherical lens, the fifth spherical lens, and the sixth spherical lens are each configured to converge light; and an optical aperture between the third spherical lens and the fourth spherical lens.

17. The optical receiver of claim 14, wherein the set of reception optics comprises:

a first cylindrical lens to receive light reflected from one or more objects;

a second cylindrical lens to receive light from the first cylindrical lens, wherein the second cylindrical lens is in a crossed arrangement to the first cylindrical lens;

a first spherical lens to receive light from the second cylindrical lens;

a second spherical lens to receive light from the first spherical lens; and an aspherical lens to receive light from the second spherical lens.

18. The optical receiver of claim 14, wherein the set of reception optics is configured to produce a first magnification in a horizontal direction and a second magnification, different from the first magnification, in a vertical direction.

19. The optical receiver of claim 14, wherein the image sensor array is a single-photon avalanche diode (SPAD) array.

20. The optical receiver of claim 14, wherein the first aspect ratio of the emitter array is in a range from 0.12 to 0.16, wherein the second aspect ratio of the field of view is in a range from 2.6 to 4.2, and wherein the third aspect ratio of the image sensor array is in a range from 3 to 3.8.

* * * * *